(12) United States Patent
Illsley et al.

(10) Patent No.: US 9,221,956 B2
(45) Date of Patent: Dec. 29, 2015

(54) GAS BARRIER COATINGS

(75) Inventors: Derek Ronald Illsley, Frome (GB); Sarfaraz Akhtar Khan, Orpington (GB); Graham Trevor Street, London (GB)

(73) Assignee: Sun Chemical Corporation, Parsippany, NJ (US)

( * ) Notice: Subject to any disclaimer, the term of this patent is extended or adjusted under 35 U.S.C. 154(b) by 428 days.

(21) Appl. No.: 13/508,711

(22) PCT Filed: Nov. 19, 2010

(86) PCT No.: PCT/GB2010/002148
§ 371 (c)(1),
(2), (4) Date: Jul. 19, 2012

(87) PCT Pub. No.: WO2011/061510
PCT Pub. Date: May 26, 2011

(65) Prior Publication Data
US 2012/0272618 A1    Nov. 1, 2012

Related U.S. Application Data

(60) Provisional application No. 61/262,979, filed on Nov. 20, 2009.

(51) Int. Cl.
| | | |
|---|---|---|
| *C09D 129/04* | (2006.01) | |
| *C09D 133/02* | (2006.01) | |
| *B65D 65/40* | (2006.01) | |
| *C08J 7/04* | (2006.01) | |
| *C09D 5/02* | (2006.01) | |
| *C09D 7/12* | (2006.01) | |
| *C08K 3/34* | (2006.01) | |
| *C08L 33/02* | (2006.01) | |
| *C08L 35/00* | (2006.01) | |

(52) U.S. Cl.
CPC ............... *C08J 7/047* (2013.01); *B65D 65/40* (2013.01); *C09D 5/028* (2013.01); *C09D 7/1216* (2013.01); *C09D 129/04* (2013.01); *C08J 2429/00* (2013.01); *C08K 3/346* (2013.01); *C08L 33/02* (2013.01); *C08L 35/00* (2013.01); *Y10T 156/10* (2015.01)

(58) Field of Classification Search
CPC ...... C08J 7/047; C08J 2429/00; C08K 3/346; C09D 5/028; C09D 7/1216; C09D 129/04; C08L 33/02; C08L 35/00
USPC ............. 524/445; 53/396; 427/387; 428/454; 156/60
See application file for complete search history.

(56) References Cited

U.S. PATENT DOCUMENTS

| | | |
|---|---|---|
| 5,766,751 A | 6/1998 | Kotani et al. |
| 2009/0053542 A1 | 2/2009 | Kuwata et al. |
| 2009/0274843 A1 | 11/2009 | Oosaki et al. |
| 2009/0283940 A1 | 11/2009 | Oosaki et al. |
| 2010/0189944 A1* | 7/2010 | Illsley et al. ................ 428/36.7 |

FOREIGN PATENT DOCUMENTS

| | | |
|---|---|---|
| CN | 101272904 A | 9/2008 |
| EP | 0590263 A2 | 4/1994 |
| EP | 1930155 A1 | 6/2008 |
| JP | 7-251871 A | 10/1995 |
| JP | 11-246729 A | 9/1999 |
| JP | 11 246729 A | 9/1999 |
| JP | 2004-035833 A | 2/2004 |
| JP | 2008-81714 A | 4/2008 |
| WO | WO 2005/044938 A2 | 5/2005 |
| WO | 2007/034943 A1 | 3/2007 |
| WO | WO 2007034943 A1 * | 3/2007 |
| WO | WO 2009/027648 A1 | 3/2009 |
| WO | 2009/098463 A1 | 8/2009 |

* cited by examiner

*Primary Examiner* — Kelechi Egwim
(74) *Attorney, Agent, or Firm* — Charles C. Achkar; Ostrolenk Faber LLP

(57) ABSTRACT

Water-dilutable coating compositions comprising poly(vinyl alcohol) and/or ethylene-vinyl alcohol copolymer, dispersed clay and polycarboxylic acid polymer that can be prepared using convention apparatus and that provide exceptional oxygen barrier along with good laminate bond strengths at high relative humidity when incorporated into adhesively formed laminates, particularly PET-PE laminate structures.

22 Claims, 1 Drawing Sheet

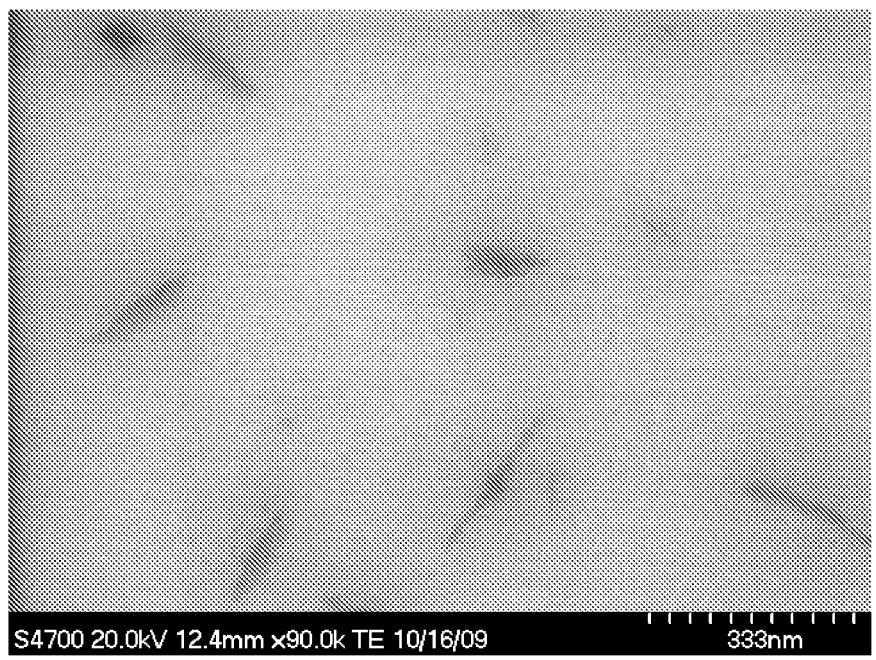

GAS BARRIER COATINGS

This application is a national stage application of PCT/GB2010/002148, filed Nov. 19, 2010, which claims priority from U.S. Patent Application No. 61/262,979, filed on Nov. 20, 2009, all of which are incorporated herein by reference in their entirety.

TECHNICAL FIELD

The present invention relates to gas barrier coatings which may be used to coat and impart gas barrier properties to a variety of materials, notably packaging for foods and pharmaceuticals. The gas barrier coatings may, in particular, be useful in the formation of adhesively formed laminates. The gas barrier coatings of the invention advantageously have the ability to block the passage of gases and, as such, may be particularly useful for use in packaging where prevention of ingress of a gas into, or escape of a gas out of, the packaging is desirable. The coatings advantageously provide an effective gas barrier and a high bond strength in high relative humidity environments.

BACKGROUND

Synthetic plastics materials have long been used for the packaging of foods and other materials which need protection from handling and from moisture. However, in recent years, it has become appreciated that, in addition, many foods and other sensitive materials benefit from being protected from atmospheric oxygen. A wide variety of multilayer laminate structures has been developed to provide barrier properties and other performance characteristics suited to a pack's purpose. These laminates may be any combination of plastic, metal or cellulosic substrates, and may include one or more coating or adhesive layers. Laminates which include polymeric films having metals or inorganic compounds, such as silicon oxides, deposited thereon have been found to give good general barrier properties and are widely used. For many purposes, it is desirable that the coating should have a covering as well as a substrate. Laminate materials in which the gas barrier coating is to be sandwiched between two films of a laminate in this way, are referred to as adhesively formed laminates. In addition to providing good gas barrier properties, good bond strength between the films and the coating is important in adhesively formed laminates.

PVDC-Based Barrier Coatings

Most commercially applied polyvinyladene chloride (PVDC) barrier layers are applied at relatively high film weights, with film weights of greater than 1.0 gsm being typical. For example, JP 62-047716B describes applying a PVDC coating to a treated polyester film, followed by adhesive lamination to a poly(ethylene) film. An oxygen barrier of 8.3 $cm^3/m^2$/day and a bond strength of 6.6 N/15 mm were recorded. Here, the oxygen barrier was achieved with a dry film weight of the PVDC of around 3 gsm (dry).

Vapor Deposited Inorganic Films

The use of vapor deposition techniques to apply silicon oxide, aluminum oxide and aluminum layers to film surfaces is well known and both excellent barrier and bond strengths are possible. Sol-gel type compositions comprising solutions of polyvinyl alcohol (PVOH) and/or ethylene vinyl alcohol (EVOH) and hydrolyzed alkoxy-silanes may be applied to the surface of the inorganic layer prior to lamination. These coatings not only enhance the barrier performance of the inorganic layer but also provide a degree of protection during printing and lamination, since these inorganic layers are very fragile. Due to the poor flex resistance of these inorganic layers these additional sol-gel coatings confer a degree of improved barrier after these types of laminates have been flexed and/or folded.

JP 2007223286 discloses coating an AlOx coated nylon film with a sol-gel coating of the type described above. When this was adhesively laminated to a PE film an oxygen barrier of 4.2 $cm^3/m^2$/day and a bond strength of 10.5 N/15 mm was achieved. JP 2005256061 discloses the printing and adhesive lamination of PET-AlOx/SiOx films to deliver oxygen barrier of 15 $cm^3/m^2$/day and a bond strength of 1.8 N/cm.

PVOH Organic Composite Coatings

WO 2007034943 describes a coating comprising both PVOH and an ethylene-maleic anhydride copolymer being applied to a nylon film followed by heat treatment (at up to 220° C.). When adhesively laminated to a heat-sealable film the laminate provided a barrier of 18.6 $cm^3/m^2$/day and a lamination bond strength of 4.0 N/cm. The high temperature treatments required in order to deliver performance are not accessible to the majority of printers and converters and thus the usefulness of for this kind of coating is limited.

Oxygen Barrier Coatings Based on PVOH/EVOH and Clay

Gas barrier coatings comprising dispersed clay, especially nanoparticles, and a hydrophilic polymer, such as polyvinyl alcohol (PVA) or ethylene-vinyl alcohol copolymer (EVOH), have been used previously. However, it has proved difficult to formulate and apply such coatings in an efficient manner that results in both good bond strengths between the flexible plastics films and adequate gas barrier properties. Examples of these compositions are disclosed in EP 0590263 B1; U.S. Pat. No. 4,818,782; EP 0479031 A; and JP-A-1313536. Typically an anchor or primer layer is required for this type of barrier coating to deliver good bond strengths in adhesively formed laminates. For example, JP-A-2007136984 (Toppan) discloses the application of EVOH-Clay composite coatings to a base layer having an anchor coat, prior to adhesive lamination to a second plastic film. The examples describe both polypropylene and polyester based webs, both requiring the use of an anchor coat prior to application of the EVOH-Clay composite. JP-A-2007136984 describes a decrease in adhesive lamination bond strength as the clay content increases.

WO 2009098463 A1 (SunChemical) describes how PVOH/EVOH-clay composite coatings are advantageously delivered as 2-pack compositions to ensure that satisfactory bond strengths were achieved in adhesively formed laminates.

Oxygen Barrier Coatings Containing Polycarboxylic Acid Polymers

JP 11-246729 (Sumitomo) discloses a resin composition containing polyvinyl alcohol, a water-soluble polyacrylic acid system compound, and an inorganic laminar compound. The resin composition is obtained by processing polyvinyl alcohol, a water-soluble polyacrylic acid system compound, and an inorganic laminar compound with a high pressure dispersion apparatus. JP 11-246729 discloses that the inorganic laminar compound may be mixed with water prior to combining with a solution of polymers. However, in order to fully disperse the inorganic laminar compound in the resin composition, processing of such a mixture through high pressure dispersion apparatus is required. The application of the coating to a polyester film and subsequently laminating it to a LLDPE film is described.

U.S. Pat. No. 6,709,735 B2/EP 1 451 008 B1 and U.S. Pat. No. 6,991,837 B2 (Mitsubishi) disclose the use of compositions of PVOH and copolymers of acrylic acid and maleic acid with a molecular weight of from about 3500 to about 5000 to prepare barrier coatings.

Barrier Coatings with Good Barrier Properties at High RH

U.S. Pat. No. 7,521,103 B2 (Mitsubishi) discloses compositions including copolymers of vinyl alcohol and vinyl amine. The use of this copolymer is shown to provide a superior barrier to that in the earlier patents particularly at raised RH.

SUMMARY OF THE INVENTION

The present invention provides a process of preparing a gas barrier coating composition, comprising mixing (a) a polymer composition comprising a solution or dispersion of polyvinyl alcohol (PVOH) and/or ethylene vinyl alcohol (EVOH) copolymer and an aqueous solution or dispersion of polycarboxylic acid polymer with (b) a previously prepared dispersion of clay; the gas barrier coating composition obtained by that process; and a coating prepared from that gas barrier coating composition. The invention further provides a method of preparing a gas barrier material including the step of coating a flexible polymer film with the gas barrier coating composition of the invention, and also the gas barrier material obtained by that process.

It has been found that when a gas barrier coating composition is prepared by mixing (a) a polymer composition comprising a solution or dispersion of PVOH and/or EVOH copolymer and a solution or dispersion of polycarboxylic acid polymer with (b) a preformed dispersion of clay, enhanced properties can be obtained, such as improved gas barrier properties and/or improved laminate bond strength. In particular, the coatings of the invention have been found to provide excellent barrier performance at high relative humidity (RH), allied with good lamination bond strengths in adhesively formed laminates, particularly in PET-PE structures. Furthermore, it has been found that excellent performance in adhesively formed laminates at elevated RH may be achieved using the coatings of the current invention without the need for any special additional primer layer.

BRIEF DESCRIPTION OF THE DRAWINGS

FIG. 1 shows a transmission electron microscope of a coating composition of the invention.

DETAILED DESCRIPTION OF THE INVENTION

In a first aspect, the present invention provides, a process of preparing a gas barrier coating composition, comprising mixing (i) a polymer composition comprising a solution or dispersion of PVOH and/or EVOH copolymer and a solution or dispersion of polycarboxylic acid polymer with (ii) a dispersion of clay.

The gas barrier coating compositions of the invention, including the gas barrier coating compositions prepared in accordance with the process of the first aspect of the invention, have been found to be particularly useful in the formation of adhesively formed laminates. In a second aspect, the invention provides a coating composition comprising a solution or dispersion of PVOH and/or EVOH copolymer and a solution or dispersion of polycarboxylic acid polymer and a dispersion of a clay obtained using the process of the first aspect of the invention. In a third aspect, the invention provides a gas barrier coating comprising PVOH and/or EVOH copolymer and polycarboxylic acid polymer dispersed with clay prepared using the composition of the second aspect of the invention. Advantageously, the coatings of the third aspect of the invention are prepared by applying the coating composition of the second aspect of the invention to a substrate and removing the solvent.

In order to achieve good barrier properties it is important that the clay is well dispersed throughout the coating compositions of the second aspect of the invention and in the coating of the third aspect of the invention. It has been found that a good dispersion of the clay in the composition or the coating is achieved if the clay is first dispersed in a liquid vehicle and the dispersion thus obtained is blended with a polymer composition. Furthermore, it has been found that poor barrier performance properties are obtained if the clay is not well dispersed in a liquid vehicle prior to blending with the polymer composition. It has further been found that the gas barrier coatings of the present invention which are formed by blending a well dispersed dispersion of clay with a polymer composition have good clarity properties and a low tendency to haze and, in particular, a lower tendency to haze than the coatings of the prior art in which the clay is less well dispersed.

The terms "dispersed clay" or "dispersion of clay" as used herein refer to a clay that is substantially intercalated or exfoliated during the dispersion process. In contrast, a clay which is merely slurried in a liquid is not substantially intercalated or exfoliated and substantial amounts of the clay will remain as a layered material. The person skilled in the art will be able to ascertain whether a clay is substantially fully exfoliated and distributed in a liquid using known techniques such as analysis under high magnification, x-ray diffraction or particle size analysis. A particular suitable method for confirming that the clay has been substantially fully dispersed is to cast a sample of a coating prepared using the dispersion onto a copper grid and inspect the sample using a transmission electron microscope.

A further particularly suitable method for confirming that a dispersed clay has been achieved is by disc ultracentrifuge particle size analysis. Particle size analysis can be used to confirm that a clay is dispersed by measuring the peak particle diameter of a sample of clay distributed in a liquid. The peak particle diameter is the most abundant maximum particle size, by relative weight of the particles. Where particles are non-spherical, the "diameter" of the particles is the maximum dimension. The peak particle diameter corresponding to a dispersed clay will vary depending on the type and source of clay used. In one embodiment, the dispersion of a clay sample for use the process of the invention has a peak clay particle diameter of no more than 115% preferably no more than about 110%, especially no more than about 108% of that of the peak particle diameter obtained using the following procedure:

25 g of clay is pre-slurried in 120 g of ethanol using an overhead paddle stirrer. This clay slurry is than transferred to a Silverson L4R laboratory vortex blender, equipped with a 1 mm screen. 350 g of water is added to the slurry. Once the addition of water is complete the power setting is increased to 50%, and the clay is then dispersed for 45 minutes. The power setting is then reduced to 25% and 60 g of ethanol is added. After 5 minutes further stirring the dispersion is discharged.

The peak particle size may be measured using any standard technique, for example be measured using a CPS DC24000 disc ultracentrifuge particle size analysis instrument as described with reference to Examples 32 below.

It has been found that the level of dispersion of a clay in a coating composition correlates to the haze that a layer of coating produced when applied to a clear substrate, especially a clear colourless, plastics substrate such as a PET film. In one embodiment the coating compositions of the invention provide a haze value of less than about 32%, preferably less than about 24% and especially less than about 20% when applied as a wet film weight of 24 gsm to polyester film and then dried. The haze value may be obtained using any standard apparatus such as a Byk-Gardener Haze-gard dual apparatus. The polyester film is, for example, a corona treated 12 μm thick polyester film, such as a Mylar 800 film.

In a fourth aspect the invention provides a process of preparing a gas barrier material comprising the step of coating a substrate, for example a flexible polymer film, with the gas barrier coating composition of the second aspect of the invention. In one embodiment, the process of the fourth aspect of the invention includes the steps (a) of preparing a gas barrier coating composition in accordance with a process of the first aspect of the invention; and (b) of coating a flexible polymer film with the gas barrier coating composition. Advantageously, step (b) is carried out within 24 hours of completing step (a). Advantageously, coating step (b) includes the step of drying the gas barrier composition to form a dry coating. Gas barrier materials of the invention, including gas barrier materials prepared in accordance with a process of the fourth aspect of the invention, have been found to be particularly suitable for use at high relative humidity.

In a fifth aspect of the invention, there is provided a gas barrier material comprising a coating of the third aspect of the invention, for example, a coating of the third aspect of the invention on a flexible polymer film. Advantageously, the gas barrier material of the fifth aspect of the invention is prepared in accordance with a process of the fourth aspect of the invention.

In one embodiment, the gas barrier material prepared by the process of the fourth aspect of the invention or the gas barrier material of the fifth aspect of the invention is a laminate material comprising a first film adhered a second film. In one embodiment of the fourth aspect of the invention, the process comprises the steps (a) of preparing a gas barrier coating composition in accordance with the process of the first aspect of the invention; (b) of coating a first flexible polymer film with the gas barrier coating composition; (c) of applying an adhesive coating to either or both of the coated side of said first film or to a second flexible polymer film; and (d) of adhering the first and second films. Advantageously, the process of the fourth aspect of the invention is used to prepare an adhesively formed laminate material. In one embodiment of the fourth aspect of the invention, the gas barrier material is incorporated into an adhesively formed laminate, such that, the bond strength between the two films is at least about 1.0 N/15 mm after storing the laminate for 2 days at 75% relative humidity after the adhesive has fully cured. In some embodiments, each of steps (b) to (d) are carried out within 24 hours of completing step (a). The first film to which the coating is applied may be referred to as a substrate and the second film that is adhered to the substrate may be referred to as the covering. For the avoidance of doubt, the gas barrier coating is typically, interposed between the first film or substrate and the second film or covering in a completed adhesively formed laminate material prepared in accordance with the process of the fourth aspect of the invention or in an adhesively formed laminate material of the fifth aspect of the invention. The adhesively formed laminates may, optionally, include areas of printed design.

The gas barrier materials of the invention have been found to be particularly effective in blocking the passage of oxygen. The materials of the invention have also been found to be useful in blocking the passage of other gases, including inert gases, such as nitrogen, and gaseous volatile organic compounds, such as petroleum fumes. As such the gas barrier materials of the invention may be used both in applications were the ingress of gases into a package is undesirable, such as the protection of packaged articles from the ingress of oxygen, and in application were retention of gases with a package is desirable, such as the retention of an inerting gas within a packaging. The gas barrier materials of the invention may also be used in applications were the prevention of passage of odorous gases through a barrier is desired.

In a sixth aspect, the invention provides a packaged article, such as foodstuff, pharmaceutical or other material, for example a foodstuff, pharmaceutical or other material sensitive to oxygen, wherein the packaging comprises a gas barrier material of the fifth aspect of the invention. In one embodiment, the invention provides a packaged article, such as foodstuff, pharmaceutical or other material, for example a foodstuff, pharmaceutical or other material sensitive to oxygen, wherein the packaging comprises a gas barrier material including a gas barrier coating comprising PVOH and/or EVOH copolymer, and polycarboxylic acid polymer dispersed with clay.

In a seventh aspect, the invention provides a method of protecting an article from spoilage comprising packaging the article in a package that includes gas barrier material according to the fifth aspect of the invention. In one embodiment of the seventh aspect of the invention, there is provided the use of a gas barrier material of the fifth aspect of the invention as a packaging material for an article to protect against spoilage of the article, prolong the shelf life of the article and/or delay deterioration of the article. In one embodiment, the article is a food product, a pharmaceutical or other article that is sensitive to oxygen and which, for example, deteriorates on exposure to oxygen.

It is to be understood that features of described herein with respect of any one of the first, second, third, fourth, fifth, sixth or seventh aspects of the invention may also be present in other aspects of the invention where appropriate.

Although previously known 2-pack PVOH/EVOH-clay composite coatings can be used to produce adhesively formed laminates with excellent oxygen barrier and laminate bond strengths at ambient conditions of 23° C. and 50% RH, it has surprisingly been found that the performance of this type of coating deteriorates at elevated RH, such as RH above 50%. At elevated RH, the performance of known coatings with compositions has been found to deteriorate significantly with respect to both oxygen barrier performance and laminate bond strength. Coating compositions of the present invention advantageously improve the high humidity performance in both respects. In particular, gas barrier coatings prepared from coating compositions of the invention have been found to display enhanced performance at high relative humidity (RH), such as an RH of about 50% or higher, especially about 60% RH or higher, more especially about 70% RH or higher, for example about 75% RH or higher. The gas barrier coatings of the invention have been found to allow strong inter-film bond to be formed in adhesively formed laminates, such as PET-PE laminates. In particular, it has been that the gas barrier coatings of the invention allow strong inter-film bonds to be formed at elevated RH, such as greater than about 50%, for example greater than about 75%. Advantageously, the bond strength between the two films is at least about 1.0 N/15 mm after storing the laminate for 2 days at 75% relative humidity after the adhesive has fully cured. Furthermore, is has been shown that an anchor coat is not required to achieve good lamination bond strengths. Although the gas barrier coating compositions of the invention have been found to be suitable for use in the formation of an adhesively formed laminate material which have good performance at elevated RH, it is understood that these gas barrier coating compositions can also be utilized at lower RH, for example, less than 50% and good performance is typically also observed at low RH values.

Advantageously, the present invention provides a method of preparing a gas barrier coating composition with good oxygen barrier performance and good adhesion properties at high RH using convention equipment. The gas barrier coating composition of the invention is generally prepared by blending (i) solutions or dispersions of the PVOH/EVOH and polycarboxylic acid polymers with (ii) a dispersion of clay. The process typically enables well controlled proportions of each of the three components to be achieved. Furthermore, the process results in the clay being well dispersed in the polymeric components of the coating composition. A preferred technique in the preparation of the coating composition is using high shear dispersion apparatus to prepare the clay dispersion via a separate process before blending this dispersion with a polymer composition comprising a solution or dispersion of the PVOH/EVOH and a solution or dispersion of polymeric acid, for example a solution of PVOH/EVOH and polymeric acid. In one embodiment, the first aspect of the invention provides a process of preparing a gas barrier coating composition, comprising the steps of dispersing clay using a high shear dispersion apparatus; and then of mixing (i) a polymer composition comprising a solution or dispersion of PVOH and/or EVOH copolymer and a solution or dispersion of polycarboxylic acid polymer with (ii) the dispersion of clay. The dispersion apparatus may, for example, be a vortex, cavitation or bead mill type high shear dispersion apparatus. Preferably the dispersion apparatus is a vortex type dispersion apparatus. Vortex type dispersion apparatus have been found to provide particularly suitable for the dispersion of clays. The clay is dispersed in a liquid vehicle to form a dispersion of clay. Suitable liquid vehicles in which the clay is dispersed include aqueous solvents and water miscible solvents such as alcohols, especially $C_1$-$C_3$ alkyl alcohols and ketones, especially acetone. Advantageously, the solvent includes water and a miscible co-solvent. Preferred co-solvents include ethanol, n-propanol and iso-propanol. For the avoidance of doubt, the term "aqueous solvent" as used herein encompasses pure water and mixtures comprising water and one or more water-miscible co-solvents. Typically, water constitute the major part, for example at least 50% w/w of the aqueous solvent. Typically a water-miscible co-solvent constitutes less than 50% w/w of the solvent. Advantageously, the clay is dispersed in the presence of water and a water-soluble alcohol. High shear dispersion apparatus, such as vortex and cavitation types, are common to the coatings industry and, in contrast to the apparatus used in the process described in JP 11-246729, do not generate high pressures. It has been found that when a coating is prepared by dispersing the clay in situ with the PVOH/EVOH and/or the polycarboxylic acid polymer solutions or dispersions, the resulting composition possesses poor oxygen barrier properties at about 75% RH and the clay dispersion is unstable, with the clay settling out with time. Thus, conventional dispersion apparatus will not produce adequate coatings via a 1-pot process. Without wishing to be bound by any theory, it is believed that in order to provide the required oxygen barrier performance at elevated RH, the inclusion of well dispersed clay is required. Furthermore, it has been shown that without the presence of the dispersed clay, the oxygen barrier performance of PVOH/EVOH containing coatings is compromised by the inclusion of poly(acrylic acid) at elevated RH.

The clay content of the coating compositions of the invention may, for example, be in the range of about 5 wt % to about 70 wt % based on the total solid content of the coating. Advantageously, the coating compositions of the invention includes about 30% by weight (wt %) or more clay, based on the total solid content of the coating. In some embodiments, the coatings comprising 35 wt % or more clay, especially 37 wt % or more, for example 40 wt % or more clay, such as 45 wt % or more clay based on the total solid content of the coating. Particularly good gas barrier properties have been observed when clay contents of at least 37 wt % have been used. In contrast to the coatings of JP 11-246729, which are described as exhibiting a decrease in bond strength as the inorganic laminar compound concentration increases, it has been found that with the polycarboxylic acid polymer containing coatings of the present invention good bond strengths can be maintained as the clay concentration increases. In particular, good bond strengths have been observed with the coatings of the present invention having clay contents of from about 35 wt % to at least about 50 wt % based on the total solid content of the coating. For example, in PET-PE laminates, good bond strengths have been obtained with coating compositions comprising up to at least 47.5 wt % of clay based upon the total solid content of the coating. Advantageously, the coating of the invention includes no more than about 60 wt % clay, such as no more than about 55 wt % clay, for example no more than about 50 wt % clay based on the total solid content of the coating. In one embodiment, the coating of the invention has a clay content of from about 30 wt % to about 55 wt %, for example from about 35 wt % to about 50 wt % based on the total solid content of the coating.

Advantageously, the coating of the invention includes about 2 wt % or more polycarboxylic acid polymer, for example about 3 wt % or more, especially about 5 wt % or more polycarboxylic acid polymer based on the total solid content of the coating. Advantageously, the coating of the invention includes no more than about 30 wt % polycarboxylic acid polymer, for example no more than about 25 wt %, especially no more than about 20 wt % polycarboxylic acid polymer based on the total solid content of the coating. In one embodiment, the coating of the invention has a polycarboxylic acid polymer content of from about 3 wt % to about 25 wt %, for example from about 5 wt % to about 20 wt % based on the total solid content of the coating.

Advantageously, the coating of the invention includes about 20 wt % or more PVOH/EVOH, for example about 25 wt % or more, especially about 30 wt % or more PVOH/EVOH based on the total solid content of the coating. Advantageously, the coating of the invention includes no more than about 70 wt % PVOH/EVOH, for example no more than about 75 wt %, especially no more than about 60 wt % PVOH/EVOH based on the total solid content of the coating. In one embodiment, the coating of the invention has a PVOH/EVOH content of from about 25 wt % to about 65 wt %, for example from about 30 wt % to about 60 wt % based on the total solid content of the coating.

In one embodiment, the coating of the invention has a clay content of from about 30 wt % to about 55 wt %, a polycarboxylic acid polymer content of from about 3 wt % to about 25 wt % and a PVOH/EVOH content of from about 25 wt % to about 65 wt % based on the total solid content of the coating. In a further embodiment, the coating of the invention has a clay content of from about 35 wt % to about 50 wt %, a polycarboxylic acid polymer content of from about 5 wt % to about 20 wt % and a PVOH/EVOH content of from about 30 wt % to about 60 wt % based on the total solid content of the coating.

The coatings of the invention typically have solid contents of at least about 0.5 wt %, preferably at least about 1 wt %, more preferably at least about 2 wt %. The coatings of the invention typically have solid contents of no more than about 15 wt %, preferably no more than about 10 wt %, more preferably no more than about 8 wt %. In one embodiment the coatings have a solid content from about 1 wt % to about 15 wt %, for example from about 3 wt % to about 9 wt %.

Adhesively formed laminate materials of the invention, have been found to have superior adhesion and/or also good gas barrier properties at high RH. It has now been found that a laminate material which provides an advantageous balance of properties can be obtained if the coating is applied such that the following criteria is met:

$$X = A/B \cdot C/D > \text{about } 15$$

where;
A=Oxygen Transmission Rate (OTR) for the laminate (23° C./75% RH) without the coating (where OTR is the rate of diffusion of pure oxygen through a substrate as measured with a Mocon Oxtran 2/21 ($cm^3/m^2$/day));
B=Oxygen Transmission Rate for the Laminate (23° C./75% RH) with the coating;
C=Bond Strength at 75% relative humidity (N/15 mm) (Bond strength is the force required to separate the two plastic films of the laminate in a T-peel test, using a Lloyds Instruments LRX Plus apparatus with a separation speed of 200 mm/min); and
D=Dry Coating Weight (gsm) (Dry coating weight is determined from the amount of wet coating deposited on the film, and also the solid content of the coating).
Advantageously, A/B>about 8, C>about 1.0 and/or D<about 1.0.

Advantageously, the gas barrier material of the invention, i.e. the gas barrier material prepared in accordance with the process of the fourth aspect of the invention or the gas barrier material of the fifth aspect of the invention, is an adhesively formed laminate in which the above criteria is met. The interrelationship between the coating weight, barrier properties and bond strength has been evaluated and it has been found that when a process for preparing a gas barrier laminate material is tailored to meet that criteria, an optimal balance of properties is be achieved.

The component A/B is essentially a 'barrier enhancement' factor; the ratio of oxygen transmission rates achieved without, and with the barrier coating, at a relative humidity of 75%. In a preferred embodiment, this factor would be greater than about 8. For a typical PET-PE laminate with no barrier layer, the oxygen transmission rate would typically be about 100 $cm^3/m^2$/day. This means that the preferred maximum oxygen transmission rate, at about 75% RH, with a barrier coating of the current invention would be about 12.5 $cm^3/m^2$/day. The oxygen transmission rate in $cm^3/m^2$/day is measured at 23° C. and 75% relative humidity (RH) by any standard method known to the skilled person. For example, suitable ASTM standard test methods include:

D3985 Standard Test Method for Oxygen Gas Transmission Rate Through Plastic Film and Sheeting Using a Coulometric Sensor;
F1927 Standard Test Method for Determination of Oxygen Gas Transmission Rate, Permeability and Permeance at Controlled Relative Humidity Through Barrier Materials Using a Coulometric Detector; and
F2622 Standard Test Method for Oxygen Gas Transmission Rate Through Plastic Film and Sheeting Using Various Sensors.

The above ASTM tests measure oxygen transmission in $cm^3/m^2$/day at 23° C. and 50% relative humidity (RH) and therefore, for the purposes of the present invention, they are adapted such that the test is run at 75% RH.

C is a figure for bond strength, given in N/15 mm; the force required to separate the covering film from the coated substrate. Preferably, the bond strength is at least 1.0 N/15 mm. A bond strength of 1.0 N/15 mm or more has been found to provide a degree of laminate strength resulting in adequate integrity of a finished package, but lower rates are possible. The bond strength can be measured by recording the force (in units of N/15 mm, where a 15 mm wide strip of the laminate is tested) required to separate the 2 plies of a laminate in a T-peel test. The separation speed used in the examples was 200 mm/min and the instrument used was a JJ Lloyd LRX tensiometer, equipped with a 50 N load cell. The T-peel test is a well recognised test in the packaging industry. The minimum value of C is 1.0 N/15 mm which is deemed the minimum required to provide a degree of laminate strength resulting in adequate integrity of a finished package.

D is a figure for dry film weight. Gas barrier coatings of the invention will generally have solid contents of less than about 10 wt % when applied by either gravure or flexographic processes. Therefore it is unlikely that especially thick dry film thicknesses will be realistically deliverable. For example, a coating having about 6 weight % solids, when applied at about 10 micron film thickness, would deliver about 0.60 $g/m^2$ of the PVOH/EVOH & clay (some differences would occur due to the differences in density of the polymer and clay from the solvent medium). As a wet application film thickness of about 10 microns is likely to be at the upper practicable range of this type of technology applied via a gravure process, thus a preferred upper limit of about 1.0 $g/cm^3$ for the dry film weight is reasonable for this type of coating. Typically the dry coating thickness is less than about 10,000 nm, for example less than about 5000 nm, especially less than about 2000 nm, such as less than about 1500 nm. Advantageously, the dry coating thickness is from about 50 to about 1000 nm.

In one aspect, the invention relates to the surprising realisation that a gas barrier coating that meets the above test can be achieved using conventional dispersion apparatus, such as high shear mixing apparatus, if the clay is dispersed in a liquid vehicle prior to combining with a polymer composition.

Advantageously, the polymer composition used in the process of preparing the coating composition of the invention, comprises PVOH and/or EVOH copolymer in solution. Advantageously, the composition comprises polycarboxylic acid polymers in solution. The solutions or dispersion of PVOH/EVOH and polycarboxylic acid polymers used in the processes of the invention are advantageously aqueous solutions. Suitable solvents in which the polymers are dispersed or dissolved include aqueous solvents and water miscible solvents such as alcohols, especially $C_1$-$C_3$ alkyl alcohols and ketones, especially acetone. Advantageously, the solvent includes water and a miscible co-solvent. Preferred co-solvents include ethanol, n-propanol and iso-propanol. For the avoidance of doubt, the term "aqueous solvent" as used herein encompasses pure water and mixtures comprising water and one or more water-miscible co-solvents. Typically, water constitute the major part, for example at least 50% w/w of the aqueous solvent. Typically a water-miscible co-solvent constitutes less than 50% w/w of the solvent. In one embodiment, the invention provides a process of preparing a gas barrier coating composition, comprising mixing (i) an aqueous solution of PVOH and/or EVOH copolymer and polycarboxylic acid polymer with (ii) a dispersion of a clay.

The clay compound is advantageously one which disperses readily in aqueous media, a high degree of exfoliation of the mineral lamellae being required to provide the maximum barrier performance. There is no restriction on the type of clay used in this invention provided that it is sufficiently dispersible in an aqueous medium, it is capable of being intercalated or exfoliated during dispersion and/or it is suitable for use in an oxygen barrier coating. Advantageously, the clay is dispersed in an aqueous solvent or a water-miscible solvent, preferably an aqueous solvent.

The clay used is preferably nanoparticulate. A nanoparticulate clay is a clay with particles having at least one dimension in the nanometer range, i.e. of less than 100 nm. Typically nanoparticulate clay particles have a maximum thickness dimension of less than 100 nm, for example a maximum dimension of less than 50 nm, such as a maximum dimension of less than 20 nm. In an exfoliated form the aspect ratio of the clay (i.e. the ratio between the length and thickness of a single clay 'sheet') will have an impact on the level of oxygen barrier achieved. The greater the aspect ratio, the more the rate of oxygen diffusion through the dry coating and laminate will be reduced. Advantageously, the clay has an aspect ratio greater than about 20 in its exfoliated form. Clay minerals with aspect ratios between 20 and 10,000 are typically used. Particularly preferred are those minerals having an aspect ratio greater than about 50 for example greater than about 100.

Examples of suitable clays include kaolinite, montmorillonite, atapulgite, illite, bentonite, halloysite, kaolin, mica, vermiculite, diatomaceous earth and fuller's earth, calcined aluminium silicate, hydrated aluminium silicate, magnesium aluminium silicate, sodium silicate and magnesium silicate. Of these, the montmorillonite clays, including bentonites, are preferred, nanoparticulate clays being most preferred. Commercial examples of suitable materials are Cloisite Na+ (available from Southern Clay), Bentone N. Dak. (available from Elementis).

Advantageously, the polycarboxylic acid polymer(s) present in the compositions of the invention are homo- and copolymers of acids, typically unsaturated acids, for example ethylenically unsaturated acids, such as acrylic, methacrylic and maleic acid. In one embodiment, the polycarboxylic acid polymer is selected from poly(acrylic acid), poly(methacrylic acid) or copolymers thereof, or a copolymer of maleic acid with either acrylic or methacrylic acid, or blends thereof. In a further embodiment, the polycarboxylic acid polymer is poly (acrylic acid). There is no constraint on the molecular weight of the polycarboxylic acid polymer, so long as it is not so high that the viscosity of the coating becomes too high at useful solid contents to prevent application by either flexographic or gravure processes. Coatings of the current invention have been found to perform well with a range of polymeric acids and are not limited to low molecular weight copolymers of maleic acid and acrylic acid. For example, a coating prepared by the process of the current invention that includes a polymeric acid which is a copolymer of acrylic and methacrylic acid with a molecular weight of about 20,000 has been found to perform well. Advantageously, the polycarboxylic acid polymer has a molecular weight of less than about 300,000, for example, less than about 200,000, especially less than about 150,000. In a preferred embodiment, the polycarboxylic acid polymer is used in its predominantly non-neutralized form. Advantageously, the polycarboxylic acid polymer used is predominantly in the form of the free acid, for example, at least 50 mol. % of the carboxylic acid groups in the polymer are in the free acid form, especially at least 70 mol % and more especially at least 90 mol % of the carboxylic acid groups in the polymer are in the free acid form. It has been shown that partially or fully neutralized analogues in which substantial proportions of the acid moieties have been converted to salts may induce a deterioration of both oxygen barrier and laminate bond strength performance at high humidity. Advantageously, the pH of the polycarboxylic acid solution or dispersion used in the formation of the gas barrier coating compositions has a pH of about 4 or less, for example about 3.5 or less, especially about 3 or less. Typically, the polycarboxylic acid solution or dispersion has a solids content of from about 10 to about 50 wt %. In one embodiment, the gas barrier coating composition is substantially free of partially or fully neutralized polycarboxylic acid polymers. Preferably the gas barrier coating composition is prepared with substantially no basic components that are capable of forming salts with the polycarboxylic acid polymers.

In one embodiment, the gas barrier coating composition comprises a solution or dispersion, preferably a solution, of EVOH copolymer. In a further embodiment, EVOH copolymer is dispersed in the coating of the invention. Advantageously, the EVOH copolymer is a vinyl alcohol-ethylene copolymer where the ethylene content is less than 20 mol. %. Conventional EVOH copolymer, as used in the barrier coating so of JP 2007136984A, U.S. Pat. No. 4,818,782 and EP 0479031 mentioned above, has a molar concentration of ethylene of greater than 20%. It has been found that when the principal polymer component of the coatings described here is a vinyl alcohol-ethylene copolymers where the ethylene content is less than 20 mol.% (such as the range of EVOH polymers available from Kuraray under the trade name 'Exceval'), a more stable solution is provided than when a conventional EVOH copolymer is used. Whereas conventional EVOH copolymer solutions are usually applied under elevated temperature to ensure clarity of the coating as it dries, it has been found that the coatings of the invention that include an EVOH copolymer where the ethylene content is less than 20 mol. % can be applied successfully under ambient conditions.

If desired, in addition to the PVA and/or EVOH copolymer, and the polycarboxylic acid other polymers or resins may be included in the coating composition, provided these co-resins are themselves compatible in the final composition. Examples of such polymers and resins include solution acrylics, acrylic emulsions, polyesters, alkyds, sulphopolyesters, polyurethanes, vinyl acetate emulsions, poly(vinyl butyral), poly(vinyl pyrrolidone), polyamides, polysaccharides, proteins, epoxies, etc. It is also possible to include sol-gel precursors in these compositions, e.g. a hydrolysate of tetraethyl orthosilicate. Advantageously, the coating composition does not include susbtantial levels of basic polymers or resins, such as polyethyleneimine, which form salts with the polycarboxylic acid polymers.

There is no particular restriction on the nature of the substrate, although it is preferably a flexible substrate such as a plastics film, and any material suitable for the intended use may be employed. However, where the matter being packaged with the coating film of the present invention is a foodstuff or pharmaceutical, it will normally be preferred that the plastics film or other substrate should be food grade. Examples of suitable materials include: polyolefins, such as polyethylene or polypropylene; polyesters, such as polyethylene terephthalate, polybutylene terephthalate or polyethylene naphthenate; polyamides, including nylons such as nylon-6 or nylon-66; and other polymers, such as polyvinyl chloride, polyimides, acrylic polymers, polystyrenes, celluloses, or polyvinylidene chloride. The coating of the invention have been found to be particularly suitable for use with polyesters. It is also possible to use copolymers of any compatible two or more of the monomers used to produce these polymers. Furthermore, compositions of the present invention may be included in adhesively formed laminates comprising paper substrates (such as polyester and polyolefin coated paperboards commonly encountered in food packaging).

The gas barrier coatings of present invention have been found to be particularly suitable for use with flexible plastic film substrates which have relatively poor inherent oxygen barrier properties. In one embodiment, the OTR of the laminate material without the coating is at least 50 cm$^3$/m$^2$/day at 23° C. at 75% RH, especially at least 80 cm$^3$/m$^2$/day at 23° C. at 75% RH. In one embodiment, the OTR of the laminate material without the coating is at least 1000 cm$^3$/m$^2$/day at 23° C. at 75% RH.

The substrate is preferably treated by corona discharge immediately prior to its being coated with the composition of the present invention. This process is well known in the art and is described, for example, in "Plastics Finishing and Decoration", edited by Donatas Satas, published by Van Nostrand Reinhold Company in 1986, at pages 80-86. In the Examples hereafter, for the corona discharge treatment we achieved a surface energy greater than 50 Dynes/cm. In one embodiment, the coating is applied to corona discharge treated plastic film, such as PET (polyester), and laminated to a second plastic film, such as poly(ethene), using a suitable laminating adhesive.

There is no particular restriction on the nature of the covering film. The types of plastic film described above for use as a substrate are generally also suitable for use as the covering film. The covering film may be the same as the substrate film or they may be different from each other.

There is no particular restriction on the nature of the adhesive used, and any adhesive commonly used for the adhesion of two or more plastics films may be employed in the present invention. Examples of suitable adhesives include solvent-based (polyurethane) types such as those from Henkel (Liofol UR3969/UR 6055, Liofol UR3640/UR6800, Liofol UR3894/UR6055), Rohm&Haas (Adcote 811/9L10) and Coim (CA2525/2526), Solvent-free polyurethane adhesives such as Liofol 7780/UR6082, UR7750/UR6071 from Henkel, and Mor-Free ELM-415A/Mor-Free CR140 from Rohm&Haas, can also be used. As well as polyurethane adhesives, epoxy-based types such as Lamal 408-40A/C5083 may be used. Waterborne adhesives, such as Aqualam 300A/300D, an epoxy type from Rohm&Haas may also be used.

The adhesive may be applied directly to one of the films and then adhered to the gas barrier coating on the other film, or it may be applied to the gas barrier coating on one film and then adhered to the other film. In any case, the order of layers will be: a plastics film; the gas barrier coating; an adhesive; and another plastics film. If desired, layers of other materials may be interposed between any two of these layers, or on either side of the 2 flexible plastic film substrates having the barrier coating between them.

In one embodiment of the fourth aspect of the invention, the gas barrier material is incorporated into an adhesively formed laminate, such that, the bond strength between the two films is at least about 1.0 N/15 mm after storing the laminate for 2 days at 75% relative humidity after the adhesive has fully cured.

The coating compositions can be applied at any wet film weight; but ultimately the maximum wet film weight will be determined by the need to apply these coatings at realistic press speeds on conventional presses. Therefore, a preferred applied maximum film weight would be about 10 gsm (wet). Given that the solid content of these coatings will be in the range of about 4-9% then the likely maximum dry film weight applied would likely be about 1.0 gsm (dry). Due to the differing densities of PVOH/EVOH (for PVOH about 1.3) and the clay (for montmorillonite about 2.5), film weight is a more relevant characteristic for the gas barrier materials of the invention than film thickness In one embodiment, the invention provides a process for preparing a gas barrier material, comprising mixing a solution or dispersion of a PVOH and/or EVOH and an aqueous solution or dispersion of polycarboxylic acid polymer with a previously prepared dispersion of a clay, and then carrying out the steps:

a. coating a first flexible polymer film with the resulting mixture;
b. applying an adhesive coating to either or both of the coated side of the first film or to a second flexible polymer film; and
c. adhering the first and second films together, the bond strength between the two films being at least about 1.0 N/15 mm (after storing the laminate for 2 days at 75% relative humidity) and more preferably greater than about 1.5 N/15 mm after the adhesive has fully cured.

Advantageously, steps a, b and c are carried out within about 24 hours of completing the mixing of the three components. Advantageously, the clay is present in the amount of about 35-50 weight %, the polycarboxylic acid polymer is present in the amount of about 5-20 weight % and the PVOH/EVOH is present in the amount of about 30-60 weight % of the total solid content of the coating. Advantageously, the polycarboxylic acid polymer is predominantly in its non-neutralised form. Advantageously, the polycarboxylic acid polymer is a homo- or copolymer of acrylic acid and/or methacrylic acid, or a copolymer of maleic acid and acrylic acid. Advantageously, the polycarboxylic acid polymer has a molecular weight of less than about 200,000. Advantageously, the dry coating thickness is from about 50 to 1000 nm. Advantageously, the clay (in its exfoliated form) has an aspect ratio greater than about 20. Advantageously, the clay dispersion is made using conventional high shear dispersion apparatus. Advantageously, the dispersion apparatus is a vortex, cavitation or bead mill type, preferably a vortex type dispersion apparatus. Advantageously, the clay is dispersed in the presence of water and a water-soluble alcohol.

Advantageously, the process of the invention provides a gas barrier material in which:

$(A/B) \cdot (C/D) >$ about 15, wherein

A=Oxygen Transmission Rate (23° C./75% RH) for the laminate without the coating;
B=Oxygen Transmission Rate (23° C./75% RH) for the laminate with the coating;
C=Bond Strength at 75% relative humidity (N/15 mm);
D=Coating Weight [gsm (dry)];
provided that: A/B>about 8, C>about 1.0 and D<about 1.0.

The invention further provides a packaged foodstuff, pharmaceutical or other material sensitive to oxygen, wherein the packaging comprises a gas barrier material of the invention, for example a gas barrier material prepared in accordance with the process of the invention.

The invention further provides water-dilutable coating compositions comprising poly(vinyl alcohol) and/or ethylene-vinyl alcohol copolymers, a dispersed clay and a polycarboxylic acid polymer. Preferred polycarboxylic acid polymers include homo- and copolymers of acrylic acid, methacrylic acid and maleic acid. The coatings provide exceptional oxygen barrier when incorporated into adhesively formed laminates, along with good laminate bond strengths, particularly for PET-PE laminate structures.

EXAMPLES

The following examples illustrate specific aspects of the present invention and are not intended to limit the scope thereof in any respect and should not be so construed.

The oxygen transmission rates (OTR) of the coated samples were determined on a Mocon Oxtran 2/21 gas permeability tester at 23° C. and 75% relative humidity. The substrate used in all cases was freshly corona discharge treated 12 micron Mylar 800. The coatings were applied with a No. 2 K-bar (about 12 microns) and were dried in a warm flow of air (lab prints were dried with a hair dryer). The dry coating weight was approximately 0.84 gsm. The coatings were applied to the Mylar 800 shortly after mixing of the clay dispersion and the polymer composition, typically within two hours.

The laminates were prepared by applying the coating to the treated side of the polyester film, an adhesive was applied over the top of the dried coating then laminated to the treated side of a 30 μm gauge poly(ethene). The adhesive used was supplied by Morchem, PS220/CA40, and was prepared according to the manufacturer's instructions and applied so as to achieve a final dry film weight of about 2.5 gsm. The laminates were then stored for 10 days at 25° C. to ensure full cure of the isocyanate-based adhesive.

The laminates were then tested for bond strength (N/15 mm) after being stored for 2 days at 75% RH.

The following coating examples were prepared, according to a constrained mixtures design-of-experiment by blending a PVOH solution having 12 weight % solids with a clay dispersion having a solid content of 4.5 weight %, and with an aqueous solution of a polycarboxylic acid polymer. The PVOH solution comprised 12% of Exceval AQ4104 and 30% n-propanol. The remainder of the solution was deionized water. The clay dispersion contained 4.5 weight % of Cloisite Na+ and 30% iso-propanol; the remainder being deionized water. The clay was dispersed using a high shear blender. This was achieved by initially forming a slurry of the clay in the alcohol to which the deionized water was then added. Unless otherwise stated, a Dispermat CV cavitation type blender with a 1 L cylindrical vessel and a 4 cm blade at 2500 rpm for 45 minutes was used to prepare the dispersion. The total mass of dispersion was 500 g. The coatings were made at a total solid content of about 7.0 weight % by blending the PVOH solution, the clay dispersion and poly(acid) solutions in the correct amounts. The remainder of the coating was made up with deionized water.

Examples 1-13

Performance of Barrier Coatings Based on Poly(Acrylic Acid)

The Table 1 provides the detail of the coatings prepared with Acriflow 041S, a poly(acrylic acid) solution obtained from Witton Chemicals, along with their oxygen barrier performance, bond strengths and calculated A/B and X values.

TABLE 1

| Example | Relative concentration of Exceval AQ-4104 (% of solid content) | Relative Concentration of Cloisite Na+ | Relative Concentration of poly(acrylic acid) | OTR at 23 C./75% RH $cm^3/m^2/day$ | Bond Strength at 75% RH; N/15 mm | A/B | X |
|---|---|---|---|---|---|---|---|
| 1 | 55 | 35 | 10 | 13.9 | 1.9 | 7.3* | 16.5 |
| 2 | 47.5 | 35 | 17.5 | 15.7 | 2.1 | 6.5* | 16.2 |
| 3 | 42.5 | 47.5 | 10 | 8.5 | 1.6 | 12 | 22.9 |
| 4 | 35 | 47.5 | 17.5 | 9.6 | 1.65 | 10.6 | 20.9 |
| 5 | 51.25 | 35 | 13.75 | 16.8 | 1.8 | 6.1* | 13.0* |
| 6 | 48.75 | 41.25 | 10 | 8.7 | 1.9 | 11.7 | 26.5 |
| 7 | 38.75 | 47.5 | 13.75 | 8.2 | 1.45 | 12.4 | 21.5 |
| 8 | 41.25 | 41.25 | 17.5 | 11.5 | 1.65 | 8.9 | 17.4 |
| 9 | 45 | 41.25 | 13.75 | 10.2 | 1.8 | 10 | 21.4 |
| 10 | 50 | 38.125 | 11.875 | 13.1 | 1.9 | 7.8* | 17.6 |
| 11 | 46.25 | 38.125 | 15.625 | 10.6 | 1.8 | 9.6 | 20.6 |
| 12 | 43.75 | 44.375 | 11.875 | 11.4 | 1.75 | 8.9 | 18.6 |
| 13 | 40 | 44.375 | 15.625 | 9.6 | 1.7 | 10.6 | 21.5 |

Note:
The OTR of Mylar 800 without any coating was about 102 $cm^3/m^2/day$.
*Results fall outside the preferred limits specified above.

In each of Example 1 to 13, good bond strengths between films were observed. Higher barrier enhancement factors were be achieved in the examples in which the clay content was about 38 wt % or higher. Only the coating of Example 5 provided an X value of below 15.

Examples 14-26

Examples 1-13 were repeated except these coatings were made using Sokalan CP12S, a copolymer of acrylic and maleic acid, obtained from BASF [aka poly(maleic-co-acrylic acid]

TABLE 2

| Example | Relative concentration of Exceval AQ-4104 (% of solid content) | Relative Concentration of Cloisite Na+ | Relative Concentration of poly(acrylic acid) | OTR at 23 C./75% RH cm$^3$/m$^2$/day | Bond Strength at 75% RH; N/15 mm | A/B | X |
|---|---|---|---|---|---|---|---|
| 14 | 55 | 35 | 10 | 15.5 | 2.1 | 6.6* | 16.5 |
| 15 | 47.5 | 35 | 17.5 | 19.2 | 2.3 | 5.3* | 14.5* |
| 16 | 42.5 | 47.5 | 10 | 9.4 | 1.7 | 10.9 | 22.0 |
| 17 | 35 | 47.5 | 17.5 | 10.4 | 1.75 | 9.8 | 20.3 |
| 18 | 51.25 | 35 | 13.75 | 12.5 | 1.6 | 8.2 | 15.5 |
| 19 | 48.75 | 41.25 | 10 | 10.1 | 2.2 | 10.1 | 26.4 |
| 20 | 38.75 | 47.5 | 13.75 | 8.97 | 1.7 | 11.4 | 23.0 |
| 21 | 41.25 | 41.25 | 17.5 | 12.74 | 1.8 | 8.0 | 17.2 |
| 22 | 45 | 41.25 | 13.75 | 9.7 | 1.8 | 10.5 | 22.5 |
| 23 | 50 | 38.125 | 11.875 | 11.5 | 2.0 | 8.9 | 21.1 |
| 24 | 46.25 | 38.125 | 15.625 | 12.33 | 2.3 | 8.3 | 22.7 |
| 25 | 43.75 | 44.375 | 11.875 | 8.26 | 1.9 | 12.3 | 27.9 |
| 26 | 40 | 44.375 | 15.625 | 10.8 | 2.1 | 9.4 | 23.6 |

*Results fall outside the preferred limits specified above

Example 27

A Repeat of Example 25, but Replacing the Sokalan CP12S with Sokalan CP13S [Poly(acrylic acid-co-methacrylic acid]

TABLE 3

| Example | Relative concentration of Exceval AQ-4104 (% of solid content) | Relative Concentration of Cloisite Na+ | Relative Concentration of poly(acrylic acid) | OTR at 23 C./75% RH cm$^3$/m$^2$/day | Bond Strength; N/15 mm | A/B | X |
|---|---|---|---|---|---|---|---|
| 27 | 43.75 | 44.375 | 11.875 | 6.6 | 2.0 | 15.5 | 36.8 |

In order to confirm that the clay has been substantially fully dispersed, a sample of the material of Example 27 was diluted with de-ionised water and then cast onto a copper grid and allowed it to dry. The sample was then inspected under a transmission electron microscope to confirm that a substantial portion of the mineral had been fully dispersed. The results are shown in FIG. 1.

Powder X-ray diffraction analysis was also used to confirm that the clay dispersion used in the preparation of Example 27 was fully dispersed. As powder X-ray diffraction analysis is run on a dried and ground coating, it provides indirect information about the extent of dispersion of the wet dispersion. Furthermore, higher concentrations of clay may re-agglomerate during the drying process and as such, information about the level of dispersion of the clay is most reliably obtained when testing coating composition compared using low concentrations of clay.

A coating similar to that of Example 27 but with 10% by weight Cloisite Na+, the diffraction peak at 12.1 Angstroms corresponding to the $d_{001}$ (the distance between clay lamellae observed in a sample of undispersed Cloisite Na+) had disappeared indicating that the clay had been exfoliated. As the clay concentration was increased to 25% and the 40-45% of Example 27, a diffraction pattern re-appeared, at 35 and 26 Angstroms respectively. This clearly indicates a re-ordering of the clay in order to provide a diffraction pattern; as the clay concentration increases the distance between lamellae decreases, as would be expected. This data shows that in order to confirm that the dispersion used to prepare Example 27 was fully exfoliated, rather than, for example an intercalated composite it is necessary to analyse a coating comprising 10 wt % of the clay.

This analysis confirmed that the preparation of a clay dispersion using a Dispermat CV cavitation type blender using the techniques described above is sufficient to cause a high level of exfoliation of the clay.

Comparative Examples 1 & 2

Example 27 was repeated, but without the Sokalan CP13S (Comparative Example 1). Also, a coating having a clay concentration below the preferred level of at least 30 wt % was prepared (Comparative Example 2). The following results were achieved.

TABLE 4

| Example | Relative concentration of Exceval AQ-4104 (% of solid content) | Relative Concentration of Cloisite Na+ | Relative Concentration of poly(acrylic acid) | OTR at 23 C./75% RH $cm^3/m^2/day$ | Bond Strength; N/15 mm | A/B | X |
|---|---|---|---|---|---|---|---|
| Comparative Example 1 | 55.625 | 44.375 | 0 | 12.7 | 0.8 | 8.0 | 7.6 |
| Comparative Example 2 | 72.5 | 27.5 | 0 | 22.3 | 0.6 | 4.6 | 3.3 |

It is evident from Comparative Example 1 that the inclusion of the (polymeric) acid facilitates the advantageous delivery of the combination of oxygen barrier and laminate bond strength at high RH. Comparative Example 2 demonstrates the effect of decreasing the level of clay on the oxygen barrier performance of the coating and indicate that clay levels of below 30 wt % do not result in coatings with particularly good barrier performance.

Comparative Examples 3-5

To demonstrate the role of the (polymeric) acid in combination with the PVOH and clay, compositions were prepared without any clay. These compositions are provided in Table 5 below, along with the OTR results at 75% RH.

TABLE 5

| Example | Relative concentration of Exceval AQ-4104 (% of solid content) | Relative Concentration of Cloisite Na+ | Relative Concentration of poly(acrylic acid) | OTR at 23 C./75% RH $cm^3/m^2/day$ | Bond Strength; N/15 mm | A/B | X |
|---|---|---|---|---|---|---|---|
| Comparative Example 3 | 100 | 0 | 0 | 43.7 | 0.6 | 2.3 | 1.7 |
| Comparative Example 4 | 90 | 0 | 10 | 54.9 | 0.8 | 1.9 | 1.8 |
| Comparative Example 5 | 80 | 0 | 20 | 64.6 | 1.1 | 1.6 | 2.1 |

Comparative Examples 3 to 5, along with Comparative Examples 1 and 2, demonstrate that the combination of the 3 components are key to delivering improved oxygen barrier and laminate bond strength performance at raised relative humidity. Furthermore, they demonstrate that inclusion of the 3 components at the preferred levels specified herein is advantageous in providing an optimum balance of properties.

Comparative Examples 6-8

In situ Preparation of the Clay Dispersion

JP 11-246729 indicates that compositions of this type can be made using high pressure dispersion apparatus to disperse a clay in the presence of a poly(vinyl alcohol) solution and an aqueous solution of poly(acrylic acid). However, we have found that using conventional (high shear) dispersion equipment typical of that used in the coatings industry (such as Dispermat (cavitation) and Silverson (vortex) types) this 'all-in' approach does not produce satisfactory results.

Taking the composition represented by example 27, clay dispersions were made with the following compositions:
Comparative example 6: 4% Cloisite Na+, 4.3% Sokalan CP13S (supplied as a 25% solution), 30% EtOH, 61.7% deionised water.
Comparative example 7: 4% Cloisite Na+, 31.2% of a 12.65% solution of Exceval AQ-4104, 20.3% EtOH, 44.5% deionised water.
Comparative example 8: 3.1% Cloisite Na+, 24.2% of a 12.65% solution of Exceval AQ-4104, 3.3% of Sokalan CP13S, 20.8% ethanol, 48.6% deionized water. This example is the equivalent of making the coating by the 'all-in' process.

In comparative examples 6 to 8, the ethanol was added first to the dispersion vessel, followed by the clay. The deionized water was added, followed by the other components. The clay was then dispersed according to the procedure described above.

In the cases of comparative examples 5 and 6, these were subsequently made into coatings equivalent to the composition of Example 27 by the addition of the other components and diluted with water to achieve the final solid content of about 7.0%.

The following OTRs at 23° C./75% RH were obtained;
Comparative example 6: 35.3 $cm^3/m^2/day$
Comparative example 7: 52.9 $cm^3/m^2/day$
Comparative example 8: 82.0 $cm^3/m^2/day$ These oxygen barrier results are significantly poorer than for Example 27 where the clay dispersion was prepared in a separate process and subsequently blended with the polymer solutions. Furthermore, it was observed for the clay dispersions prepared in comparative examples 7 and 8 that the clay rapidly settled out, indicating that proper dispersion had not been achieved.

Thus, a further aspect of this invention is to preferably prepare the coatings by blending an aqueous clay dispersion with solutions of poly(vinyl alcohol) and/or copolymers of ethylene and vinyl alcohol along with solutions of (polymeric) acids.

Examples 28-33

Performance Dependence on Clay Dispersion

The haze of a coating when applied to a polyester film (corona discharge treated 12 μm Mylar 800) was measured in order to evaluate the quality of the clay dispersion and its impact upon the oxygen barrier of a resulting coating was determined. The level of haze of a coating has been found to be indicative of the quality of the clay dispersion used to prepare the coating, with poorly dispersed coating compositions resulting in coatings that have a high level of haze.

Example 27 was repeated but in each case the Cloisite Na+ was dispersed in varying ways, using either the Dipermat CV, as described above mentioned, or using a Silverson L4R. Both these blenders are laboratory scale apparatus, the Dispermat being of the cavitation type and the Silverson of the vortex type. In each case approximately 500 g of clay dispersion was prepared.

By way of example, the dispersion of Example 33 was prepared as follows: 25 g of Cloisite Na+ were initially pre-slurried in 120 g of ethanol using an overhead paddle stirrer. This clay slurry was then transferred to a Silverson L4R laboratory vortex blender equipped with a 0.5 mm screen. 350 g of de-ionised water was added to the slurry. Once the addition of water was complete the power setting was increased to 50%, and the clay was then dispersed for 90 minutes. The solid content of the dispersion produced was 4.8% (w/w). Note: the reason for a lower solid content than the theoretical value is that the Cloisite Na+ contains a water residue which it picks up during storage. The other dispersions were prepared by varying the procedure in accordance with the details provided in Table 6 below.

In the case of the Dispermat, a 4 cm diameter blade was used, and the speed was varied as described in Table 6. In the case of dispersions prepared using the Silverson the impeller was set at 50% of the maximum power (75% of the maximum power for Example 33) and the screen was changed according to the detail in Table 6.

The oxygen barrier of these coatings was assessed in the same way as described in previous examples. The coatings were also applied to the PET film, but at a wet coating thickness of 24 µm, using a No. 3 K-Bar (ex. RK Print). The coatings were dried and then the haze of these coated films was determined using a Byk-Gardner Haze-gard dual apparatus.

TABLE 6

|  | OTR[1] | Haze (%)[2] | Blender Type | Speed/Screen | Dispersion time |
|---|---|---|---|---|---|
| Example 27 | 6.6 | 18.5 | Dispermat | 2500 rpm | 45 mins |
| Example 28 | 8.99 | 28.4 | Dispermat | 1000 rpm | 45 mins |
| Comparative 9 | 18.7* | 36.7 | Dispermat | 500 rpm | 45 mins |
| Example 29 | 5.86 | 16.8 | Silverson | 10 mm | 45 mins |
| Example 30 | 5.08 | 15.9 | Silverson | 2 mm | 45 mins |
| Example 31 | 4.79 | 14.8 | Silverson | 1 mm | 45 mins |
| Example 32 | 4.22 | 14.2 | Silverson | 0.5 mm | 45 mins |
| Example 33 | 3.97 | 11.8 | Silverson | 0.5 mm | 90 mins |

[1]Oxygen transmission rate was measured at 23° C./75% RH, with a 12 gsm (wet) coating on PET.
[2]Haze was a mean average of 8 readings with a 24 gsm (wet) coating on PET.
*Results fall outside the preferred limits specified above.

The clay used in the preparation of the coating composition of Comparative Example 9 was not fully dispersed and as a result provided a coating with a high haze and an oxygen barrier enhancement factor (A/B) of 5.3. The results presented in Table 6 above demonstrate the presence of a correlation between the haze of a coating, which is a measure of the degree of dispersion of the clay, and the oxygen barrier performance of the resulting coating.

The above results demonstrate that adequate levels of dispersion can be obtained using a cavitation type high shear dispersion apparatus when used at a sufficiently high rpm. However, a greater degree of dispersion was found to be achievable using a vortex type dispersion apparatus.

A Cloisite Na+ dispersion made according to Example 32 was analysed for peak particle size using a CPS DC24000 instrument; disc speed 10000 rpm; cal. Standard diameter 0.377 µm; cal. Standard density 1.385 g/mL; particle size density 2.5 g/mL; particle size absorption 0.01, particle non-spherictity 1.0, fluid density 1.064 g/mL, number of data points 1775; analysis time 5.5 minutes; total weight 44.44 µg; no offset, no noise filtration; peak detection factors: height=0.5, width=10; detected peaks 0.2156 µm. The test indicated a polydisperse sample with a peak maximum equivalent to 216 nm which is what would be expected of a fully exfoliated mineral of this type.

In contrast, when a Cloisite Na+ dispersion made according to the procedure Comparative Example 9 was analysed using an identical procedure a peak maximum of 252 nm was observed, the significantly higher peak particle size indicates that the clay was not fully exfoliated, as was confirmed by the poor gas barrier performance of the final coating of Comparative Example 9.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A process of preparing a gas barrier coating composition, comprising mixing (i) a polymer composition comprising a solution or dispersion of PVOH and/or EVOH copolymer and a solution or dispersion of polycarboxylic acid polymer with (ii) a dispersion of clay wherein the composition comprises a solution or dispersion of EVOH copolymer which is a vinyl alcohol-ethylene copolymer having an ethylene content of less than 20 mol. %.

2. The process according to claim 1, in which the clay is present in the amount of about 35-50 weight %, the polycarboxylic acid polymer is present in the amount of about 5-20 weight % and/or the PVOH/EVOH is present in the amount of about 30-60 weight % of the total solid content of the coating composition.

3. The process according to claim 1, in which the polycarboxylic acid polymer is predominantly in its non-neutralised form.

4. The process according to claim 1, in which the polycarboxylic acid polymer is a homo- or copolymer of acrylic acid and/or methacrylic acid, or a copolymer of maleic acid and acrylic acid.

5. The process according to claim 1 in which the polycarboxylic acid polymer has a molecular weight of less than about 200,000.

6. The process of claim 1, wherein the solution or dispersion of the polycarboxylic acid has a pH of about 4 or less.

7. The process according to claim 1, in which the clay is dispersed in water and/or a water-soluble alcohol.

8. The process of claim 1, in which the clay is dispersed using a high shear dispersion apparatus.

9. The process according to claim 1 in which the clay has an aspect ratio greater than about 20 in its exfoliated form.

10. A gas barrier coating composition obtained using the process of claim 1.

11. A process of preparing a gas barrier material comprising the step of coating a substrate with the gas barrier coating composition of claim 10.

12. The process of preparing a gas barrier material according to claim 11, comprising the steps (a) of preparing the gas barrier coating composition; and (b) of coating the substrate with the gas barrier coating composition.

13. The process of claim 12 in which step (b) is carried out within about 24 hours of completing step (a).

14. The process of claim 11, wherein the substrate is a flexible polymer film.

15. The process of claim 14, wherein the flexible polymer film is a first flexible polymer film and the process further comprises the steps (c) of applying an adhesive coating to either or both of the coated side of said first film or to a second flexible polymer film; and (d) of adhering the first and second films together.

16. The process of claim 11, wherein gas barrier material is incorporated into an adhesively formed laminate such that the bond strength between the two films is at least about 1.0 N/15 mm after storing the laminate for 2 days at 75% relative humidity after the adhesive has fully cured.

17. The process according to claim 11 in which the barrier coating composition is applied such that a dry coating thickness of from about 50 to about 1000 nm is formed.

18. The process according to claim 11, in which:

$$(A/B)\cdot(C/D) > \text{about } 15,$$

wherein
- A=Oxygen Transmission Rate (23° C./75% RH) for the laminate without the coating;
- B=Oxygen Transmission Rate (23° C./75% RH) for the laminate with the coating;
- C=Bond Strength at 75% relative humidity (N/15 mm);
- D=Coating Weight [gsm (dry)];

provided that:
- A/B>about 8;
- C>about 1.0; and
- D<about 1.0.

19. A gas barrier material obtained using a process comprising:

preparing a gas barrier coating composition by mixing
  (i) a polymer composition comprising a solution or dispersion of an ethylene vinyl alcohol copolymer having an ethylene content of less than 20 mol. % and a solution or dispersion of polycarboxylic acid polymer with
  (ii) a dispersion of clay; and
coating a substrate with the gas barrier coating composition.

20. An adhesively formed laminate material in which:

$$(A/B)\cdot(C/D) > \text{about } 15,$$

wherein
- A=Oxygen Transmission Rate (23° C./75% RH) for the laminate without the gas barrier coating composition prepared according to claim 19;
- B=Oxygen Transmission Rate (23° C./75% RH) for the laminate with the gas barrier coating composition;
- C=Bond Strength at 75% relative humidity (N/15 mm);
- D=Coating Weight [gsm (dry)];

provided that:
- A/B>about 8;
- C>about 1.0; and
- D<about 1.0.

21. A packaged foodstuff, pharmaceutical or other material wherein the packaging comprises the gas barrier material according to claim 19.

22. A method of protecting a foodstuff, pharmaceutical or other article that is sensitive to oxygen comprising packaging the article in a package that includes the gas barrier material according to claim 19.

* * * * *